May 1, 1934.  P. SCHANDER  1,957,000
TWISTER
Filed Aug. 15, 1931   2 Sheets-Sheet 1

INVENTOR.
Paul Schander
BY
Kiddle, Margeson my Hornidge
ATTORNEYS.

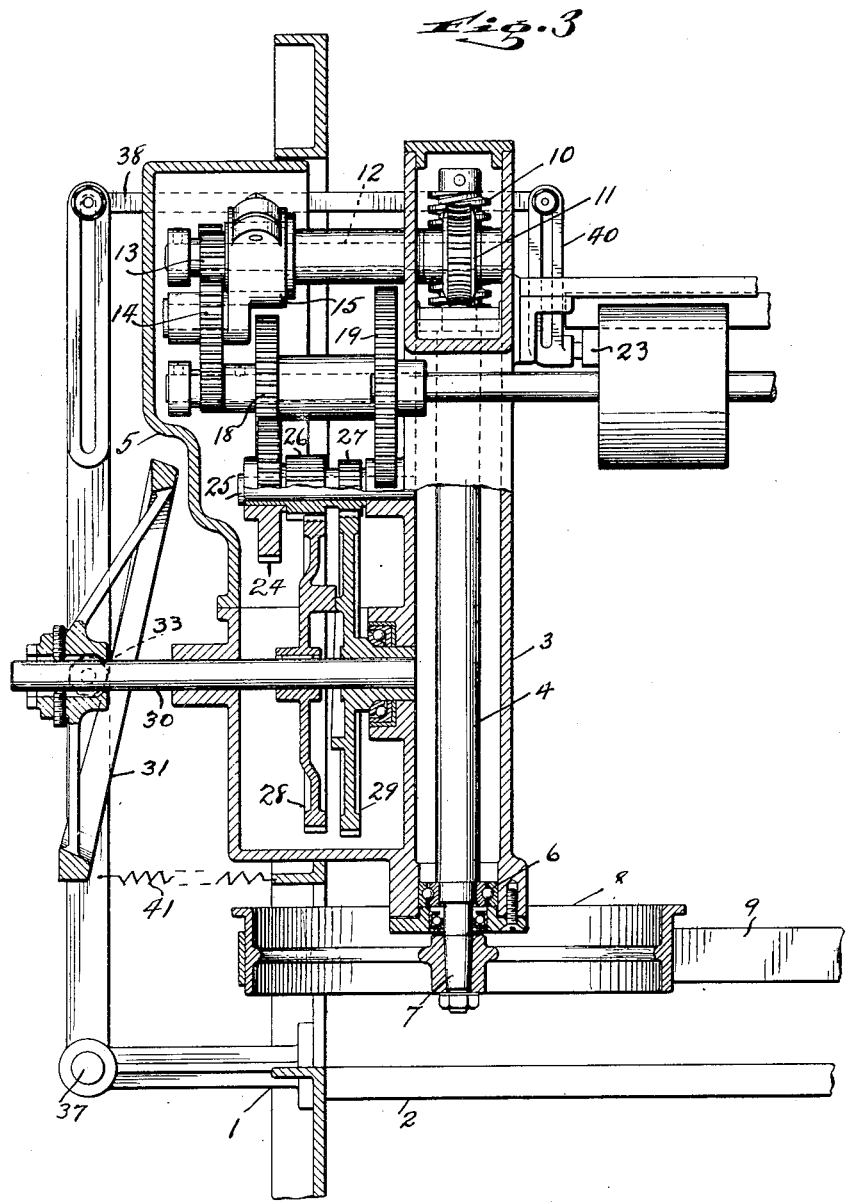

Patented May 1, 1934

1,957,000

UNITED STATES PATENT OFFICE 1,957,000

TWISTER

Paul Schander, Elkins Park, Pa., assignor to Fletcher Works, Incorporated, Philadelphia, Pa., a corporation of Pennsylvania Application August 15, 1931, Serial No. 557,409

6 Claims. (Cl. 118—40)

My invention relates to improvements in twisting machines and is particularly directed to the driving mechanism therefor.

More specifically my invention is directed to a bracket mounted at one side of the machine and carrying the gear trains for the machine instead of employing a long take up shaft back such as is necessary in twisting machines as at present constructed.

Another object of my invention resides in the reduction of the number of intermediate gears employed while still maintaining a maximum amount of twist per inch.

Another object of my invention is the provision of a machine whereby a change from right to left hand twist can readily be accomplished.

A still further object of my invention is the provision of a compact bracket which will effect a saving in space, at the same time employing a maximum number of spindles for a given length of machine and wherein all gears are mounted on the bracket on fixed centers making a complete unit, eliminating unnecessary adjustments and maintaining all gears properly meshed for smooth, even and silent operation.

Figure 1:
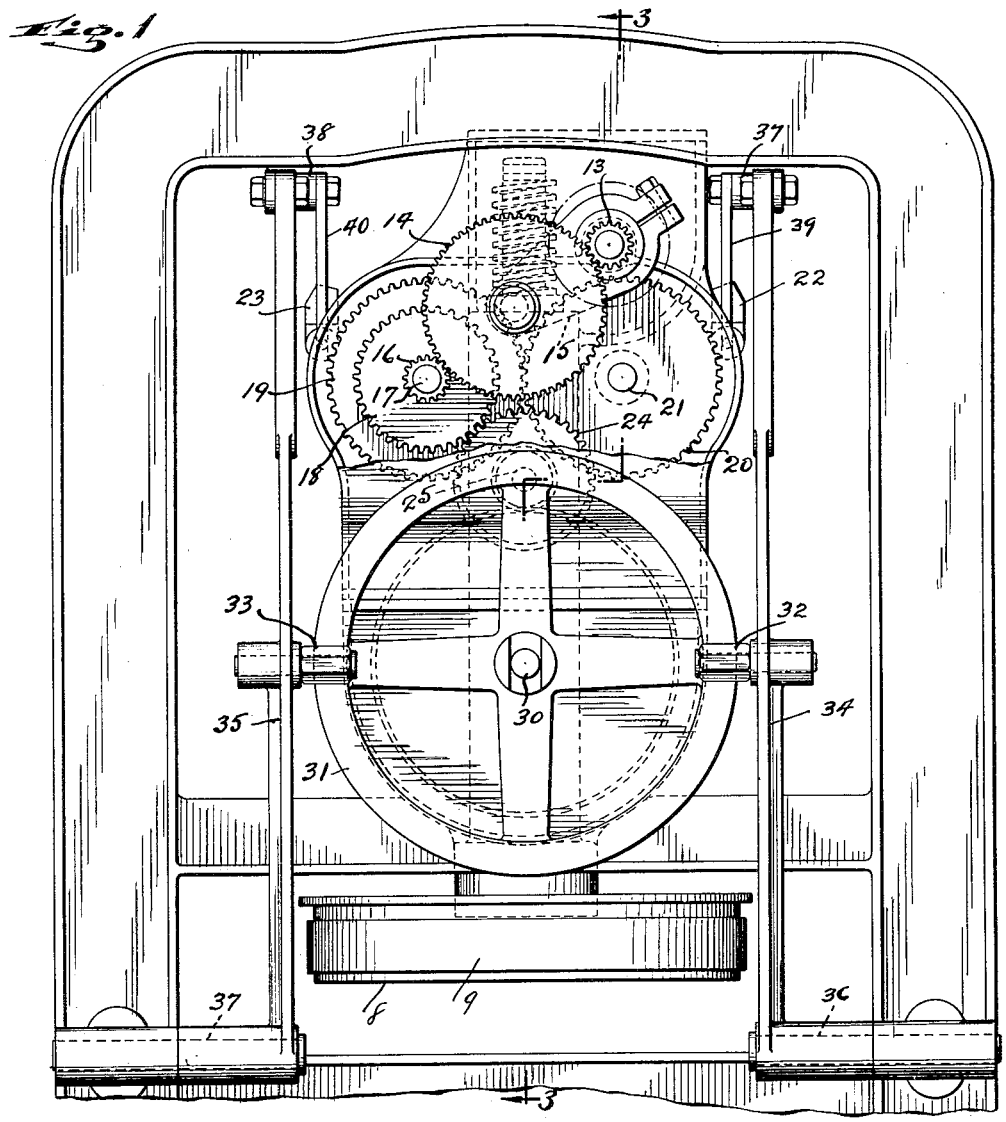
Figure 2:
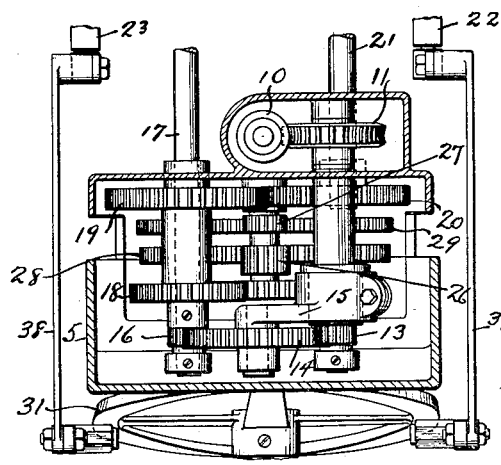

In the accompanying drawings, wherein I have illustrated an embodiment of my invention, Fig. 1 is an end elevation of my improved bracket, Fig. 2 is a plan view thereof partly in section and Fig. 3 is a view on line 3—3 of Fig. 1.

Referring to the drawings in detail, 1 designates a bracket suitably mounted on one end of a frame 2 of a twisting machine. This bracket provides a housing 3 for a drive shaft 4 which is completely enclosed therein. The bracket also provides a housing 5 for the gearing mechanism which will hereinafter be described in detail.

The lower end of the drive shaft 4 is mounted for rotation in ball bearings 6 and has a portion 7 thereof extending beyond the housing 3 where it is provided with a pulley 8. This pulley is driven from any suitable source of power such as an electric motor for example by means of the belt 9, which is the same belt that drives the whorls (not shown).

The upper end of the drive shaft 4 is provided with a worm 10 in mesh with a worm wheel 11 mounted on one end of a shaft 12 which carries a drive gear 13 at its other end. This drive gear is in mesh with an idler 14 mounted on a swinging arm 15, the idler 14 in turn meshing with a change gear 16 which is removably mounted on a take up shaft 17 as shown in Fig. 1. This take up shaft also carries a traverse drive gear 18. On this same take up shaft 17 is mounted a take up gear 19 which in turn is in mesh with a take up gear 20 mounted on the take up shaft 21.

From the description of the mechanism thus far given the operation of the take up shafts 17 and 21 will be obvious.

The change gear 16 as above mentioned is removably mounted on the take up shaft 17 and may be removed and replaced by a gear of larger or smaller diameter as desired to provide a twist anywhere from 16 to 80 per inch depending on the gear substituted as will be obvious. If it should be desired to provide a lower or tram twist from say 3 to 15 twists per inch, the worm wheel 11 may be replaced by a quadruple worm and worm wheel of lower reduction.

When it is desired to make a change in the hand of the twist, the belt 9 is reversed to reverse the spindles and in order that the take-up rollers T may not be reversed in direction due to this reversal in direction of the belt 9, the idler 14 is raised and the change gears 16 removed from the take-up shaft 17 and placed on the take-up shaft 21, and the swinging idler 14 lowered into mesh with the change gear. It will be obvious that if a larger gear is substituted for the change gear 16 the number of twists per inch will be changed accordingly. The mounting of the idler 14 on the swinging arm 15 will accommodate the idler to gears of various diameters as will be obvious.

The reciprocation of traverse bars 22 and 23 is accomplished through the medium of a gear 24 mounted on a stationary shaft 25 which also carries a double gear having a gear face 26 and a gear face 27 of smaller diameter. The gear faces 26 and 27 are in mesh with differential cam gears 28 and 29 respectively, the cam gear 28 being keyed to a cam shaft 30, the gear 29 however being rotatable on the cam shaft. This cam shaft has a bearing in the housing 5 and in the hub of the cam gear 29, and is movable longitudinally in said bearings. The cam shaft 30 carries at its outer end a traverse cam 31 which is adapted to engage friction members 32 and 33 carried by the traverse levers 34 and 35 respectively, these levers being mounted for pivotal movement in bearings 36 and 37 respectively. Gear 29 is made with a cam surface 29' on the side toward the gear 28 and gear 28 has an integral wiper 28' which rides on this cam surface.

The upper end of the traverse levers 34 and 35 are provided with links 37 and 38 respectively, which are adjustably secured at their one end to links 39 and 40 respectively, which in turn are secured to the traverse bars 22 and 23 respectively.

It will be obvious that through the operation of the differential cam gears 28 and 29 the traverse cam will be rotated to cause the traverse levers 34 and 35 to oscillate alternately against the action of a spring 41, this oscillatory motion in turn imparting the desired reciprocation to the traverse bars to lay the twisted thread on the bobbins in the proper manner.

In twisters as at present constructed wherein the traverse is driven from the opposite side of the machine from the twist gear through a long take-up shaft the teetering of this shaft is very disadvantageous. The mounting of all of the driving mechanism, in a compact bracket at one end of the machine in accordance with my invention as hereinbefore described, eliminates the driving of the traverse through the long take up shaft and thereby overcomes this teetering of the take up shafts and provides a smooth and silent operation.

The mounting of the mechanism as above mentioned is advantageous for many other reasons over the construction of the driving mechanism of twisters as at present employed. Among these manifold advantages are: the reduction of the number of intermediate gears employed, saving in space; the reduction of adjustments to a minimum; and other advantages which will be obvious to those skilled in the art.

While I have illustrated and described a preferred form of my invention, it is to be understood that I do not wish to be limited to the precise description and arrangement of parts herein described inasmuch as many variations and modifications may be made without departing from the spirit and scope of my invention.

What I claim is:

1. In a twisting machine comprising take-up rollers and traverse bars, the combination of a support for said machine, a bracket mounted on said support at one end of said machine, gearing for driving said take-up rollers carried by said bracket, take up shafts, and an idler mounted on a pivoting arm and driven by said gearing for driving said take up shafts.

2. In a twisting machine the combination of a drive shaft, a worm carried at one end of said shaft, a worm wheel driven by said worm, a shaft for said wheel, a drive gear carried by said worm wheel shaft, an idler meshing with said drive gear, said idler being mounted on a swinging bracket, a take up shaft, a change gear removably mounted on said take up shaft, a take up gear mounted on said take up shaft, said take up gear meshing with a corresponding take up gear on a companion take up shaft, a traverse drive gear on said take up shaft, and traverse bars reciprocated by said traverse drive gear.

3. In a twisting machine the combination of a drive shaft, means for driving said shaft, a worm carried by one end of said shaft, a worm wheel meshing with said worm and carried by a shaft at right angles to said drive shaft, a drive gear carried by said last mentioned shaft, an idler mounted on a swinging arm and meshing with said drive gear, a take up shaft, a change gear carried by said take up shaft and meshing with said idler for driving said take up shaft, a traverse drive gear on said take up shaft, a stationary shaft below said take up shaft, gears freely mounted on said stationary shaft below said stationary shaft, a cam shaft, differential cam gears carried by said cam shaft, a traverse cam keyed to said cam shaft, pivotally mounted traverse levers, traverse bars, said levers being connected through links to said traverse bars, said traverse cam engaging said traverse levers for imparting rectilinear motion to said traverse bars.

4. In a twisting machine, the combination of an end frame, a spindle belt, a drive shaft driven thereby, traverse bars, take-up rollers, gearing intermediate said drive shaft bars, and take-up rollers for driving said bars and rollers, said gearing including a change gear for permitting of reversing of said drive shaft without changing the direction of rotation of the take-up rollers, and a bracket mounted on said end frame and carrying said shaft and said intermediate gearing.

5. In a twisting machine the combination of a traverse cam, gearing for driving said traverse cam, take-up roller gear drive, a spindle belt, a shaft driven thereby for driving said gearing and roller gear drive, said roller gear drive comprising a change gear for permitting of reversal of said shaft without changing the direction of rotation of the take-up roller gear drive, and a mount for said drive, shaft and traverse cam providing a unit assembly for mounting at one end of the machine.

6. In a twisting machine the combination of an end frame, a spindle belt, a shaft driven thereby take-up rollers, a traverse cam gearing for driving said traverse cam, cooperating gearing for driving said take-up rollers, said traverse cam gearing and said gearing for driving the take-up rollers being driven by said shaft, the gear for driving said take-up rollers including a change gear for permitting of reversing of said drive shaft without changing the direction of rotation of the take-up rollers, a housing for said gearing, and a mount for said traverse cam, gearing and housing providing a unit assembly for mounting on said end frame.

PAUL SCHANDER.